United States Patent
Gupta et al.

(10) Patent No.: US 9,292,670 B2
(45) Date of Patent: Mar. 22, 2016

(54) SYSTEMS AND METHODS FOR GENERATING AND AUTHENTICATING ONE TIME DYNAMIC PASSWORD BASED ON CONTEXT INFORMATION

(75) Inventors: Puneet Gupta, Bangalore (IN); Venkat Kumar Sivaramamurthy, Bangalore (IN); Harigopal Kanaka Bapiraja Ponnapalli, Hyderabad (IN); Akshay Darbari, Allahabad (IN)

(73) Assignee: Infosys Limited, Bangalore (IN)

( * ) Notice: Subject to any disclaimer, the term of this patent is extended or adjusted under 35 U.S.C. 154(b) by 115 days.

(21) Appl. No.: 13/532,472

(22) Filed: Jun. 25, 2012

(65) Prior Publication Data
US 2013/0227661 A1 Aug. 29, 2013

(30) Foreign Application Priority Data
Feb. 29, 2012 (IN) .............................. 759/CHE/2012

(51) Int. Cl.
G06F 7/04 (2006.01)
G06F 15/16 (2006.01)
G06F 17/30 (2006.01)
H04L 29/06 (2006.01)
(Continued)

(52) U.S. Cl.
CPC .............. *G06F 21/31* (2013.01); *G06F 21/316* (2013.01); *H04L 9/3202* (2013.01); *G06F 21/00* (2013.01); *G06F 21/30* (2013.01); *G06F 21/313* (2013.01); *G06F 21/32* (2013.01); *H04L 9/32* (2013.01)

(58) Field of Classification Search
CPC ......... G06F 21/00; G06F 21/30; G06F 21/31; G06F 21/313; G06F 21/316; G06F 21/32; H04L 9/32; H04L 9/3202

USPC .................................................... 726/5–7, 18
See application file for complete search history.

(56) References Cited

U.S. PATENT DOCUMENTS 7,023,995 B2    4/2006    Olsson
7,418,267 B2    8/2008    Karaoguz
(Continued)

FOREIGN PATENT DOCUMENTS

GB          2463732 A    3/2010
KR    10-2011-0005614 A    1/2011

OTHER PUBLICATIONS

Usable security: User preferences for authentication methods in eBanking and the effects of experience, by CS Weir, G Douglas, T Richardson, M Jack; Interacting with Computers, vol. 22, Issue 3, May 2010.*

*Primary Examiner* — Jayesh Jhaveri
(74) *Attorney, Agent, or Firm* — LeClairRyan, a Professional Corporation

(57) ABSTRACT

The invention relates to a system and method for generating and authenticating one time dynamic password based on the context information related to a user. It involves retrieving user context information and generating a dynamic value based on that. The first one time dynamic password is generated at the user device using the first dynamic value and the user PIN. The first dynamic value along with the user identifier is sent to the authentication server. The authentication server sends the user identifier to the context management server. The context management server has access the context information used to generate the first dynamic value and based on that they generate a second dynamic value. The authentication server receives this value and generates the second one time dynamic password and if it matches with the first one time dynamic password then the authentication server authenticates the first one time dynamic password.

11 Claims, 3 Drawing Sheets

(51) Int. Cl.
*G06F 21/31* (2013.01)
*G06F 21/00* (2013.01)
*G06F 21/30* (2013.01)
*H04L 9/32* (2006.01)
*G06F 21/32* (2013.01)

(56) References Cited

U.S. PATENT DOCUMENTS

| | | | |
|---|---|---|---|
| 8,661,529 B2* | 2/2014 | Suzuki | 726/18 |
| 2008/0137861 A1* | 6/2008 | Lindmo | G06F 21/31 380/270 |
| 2009/0193264 A1* | 7/2009 | Fedronic et al. | 713/184 |
| 2009/0222669 A1 | 9/2009 | Huang et al. | |
| 2009/0235339 A1* | 9/2009 | Mennes et al. | 726/5 |
| 2011/0082767 A1* | 4/2011 | Ryu et al. | 705/26.35 |
| 2011/0202988 A1* | 8/2011 | Otranen et al. | 726/8 |
| 2011/0258452 A1* | 10/2011 | Coulier et al. | 713/171 |
| 2013/0145449 A1* | 6/2013 | Busser et al. | 726/7 |
| 2013/0174239 A1* | 7/2013 | Kim et al. | 726/7 |
| 2014/0250490 A1* | 9/2014 | Baca | H04L 9/3228 726/1 |
| 2015/0206129 A1* | 7/2015 | Perez Lafuente | H04L 63/0807 705/44 |

* cited by examiner

SYSTEMS AND METHODS FOR GENERATING AND AUTHENTICATING ONE TIME DYNAMIC PASSWORD BASED ON CONTEXT INFORMATION

CROSS-REFERENCE TO RELATED APPLICATIONS

This application claims the benefit of Indian Patent Application Filing No. 759/CHE/2011, filed Feb. 29, 2012, which is hereby incorporated by reference in its entirety.

FIELD

The present invention relates to the generation and authentication of the one time dynamic password, and in particular, to systems and methods for generating and authenticating one time dynamic password based on the context information related to a user.

BACKGROUND

One time dynamic password (OTP) is a password which is valid for only one login session. In contrast to the traditional static password they are not vulnerable to replay attacks. This means that, if a potential intruder manages to record a OTP that was already used to log into a service or to conduct a transaction, he or she will not be able to abuse it since it will be no longer valid. A typical OTP system comprises of a OTP generating client and OTP validation (authentication) server. OTP generating clients are personalized tokens implemented either in hardware or software and accordingly known as hardware token or software token respectively. In a simple login flow, a user generates a OTP using his/her OTP generating client and submit the same as password in the login screen along with user's login id. Authentication server on receipt of the credentials, generate a OTP for that user on the server, and validates the same with the user submitted OTP. If both matches, the authentication is considered successful. For the success of this system, the most critical aspect is the ability of the client and server to independently generate a OTP that is same at both ends at any given instance. It means both the client and server state need to be in synchronization at all times to generate same OTP at both ends. In many systems this synchronization is achieved by way of either using time or a counter (event) as synchronous parameter, and accordingly the systems are known as time based or counter based OTP systems. In a time based OTP system, the OTP algorithm is a function of time which is taken from a precision timer placed in the client. At any given time excluding the little deviation in network delays, both the client and server are expected to generate same OTP as long as the timers on client and server are in synchronization. Similarly, in a counter based OTP system, the OTP algorithm is a function of a counter value. An initial counter value is placed at both client and server for a user. Whenever a user generates a OTP on client, the current counter value is used to generate OTP and the counter is incremented or decremented depending on the logic. On successful validation of the OTP, the server also increments or decrements the counter and hence keeping the state of the counter in synchronization with that of client. As can be seen, in both these above techniques there is a possibility that the client and server state (time or counter value) can be out of synchronization, causing the client and server to generate OTPs that are difference and hence failing the authentication. Even a precision timer drifts the time over a period of time. Similarly some of the OTPs that are generated but are failed to submit to server (ex: due to network failure) can lead to counter values that are out of sync at both client and server. Hence, in all time or counter based OTP systems out of synchronization is a major challenge that requires human intervention to keep them in sync again, causing administrative overhead. In some implementations, auto resynchronization is feasible if the drift is small, but at the cost of security.

SUMMARY

The present invention overcomes the problem of synchronization between the client and the authentication server to generate a one time dynamic password by using user context information to generate a dynamic value which along with a user Personal Identification Number (PIN) generates the one time dynamic password.

According to the present embodiment, a method for generating and authenticating a one time dynamic password based on context information is disclosed. The method includes retrieving the context information related to a user or user device or application and then generating a first dynamic value based on the context information at a user device. On the basis of the first dynamic value and a user PIN, a first one time dynamic password is generated at the user device. Thereafter, the first one time dynamic password and at least one of an application identifier, a user device identifier and a user identifier are sent to an authentication server from the user device. Further, the authentication server sends the at least one of the application identifier, the user device identifier and the user identifier to a context management server. The context management server has access to the context information used to generate the dynamic value at the user device. After that, the context management server generates a second dynamic value based on the context information that has been used to generate the first dynamic value at the user device. Then, the authentication server generates a second one time dynamic password based on the second dynamic value received from the context management server and the user PIN which is stored in the authentication server and subsequently authenticates the first one time dynamic password generated at the user device if it matches with the second one time dynamic password generated at the authentication server.

In an additional embodiment, a system for generating and authenticating a one time dynamic password based on context information is disclosed. As disclosed, the system at the user device includes a context information retrieving module, a first dynamic value generation module, a first one time dynamic password generation module, a first one time dynamic password sending module. The system further includes an identifier sending module present in an authentication server, a second dynamic value generation module present in a context management server, a second one time dynamic password generation module and an authentication module present in the authentication server. The context information retrieving module is configured to retrieve the context information related to a user, the first dynamic value generation module configured to generate a first dynamic value based on the context information at a user device, the first one time dynamic password generation module configured to generate the one time dynamic password based on the first dynamic value and a user personal identification number (PIN) at the user device, the first one time dynamic password sending module configured to send the first one time dynamic password and at least one of an application identifier and a user device identifier and a user identifier to an authentication server, the identifier sending module configured to send the at least one of the application identifier, the user device identifier and the user identifier from the authentication server to a context management server, the user device identifier and the user identifier received from the authentication server and the context information related to the user, the second dynamic value generation module configured to generate a second dynamic value at the context management server, the second one time dynamic password generation module configured to generate a second one time dynamic password at the authentication server based on the second dynamic value received from the context management server and the user PIN stored in the authentication server and the authentication module configured to authenticate the first one time dynamic password if the first one time dynamic password matches with the second one time dynamic password. In accordance with an embodiment of the present disclosure the context management module has access to the context information used to generate the first dynamic value at the user device and the context management module knows what context information is used at the user device to generate the first dynamic value and the second dynamic value is generated based on the context information used to generate the first dynamic value at the context management server.

In another embodiment, a computer program product for generating and authenticating a one time dynamic password based on context information is disclosed. The computer program product includes a computer usable medium having a computer readable program code embodied therein for generating and authenticating a one time dynamic password based on context information. The computer readable program code storing a set of instructions configured for retrieving the context information related to a user, generating a first dynamic value based on the context information at a user device, generating a first one time dynamic password based on the first dynamic value and a user personal identification number (PIN) at the user device, sending the first one time dynamic password and at least one of an application identifier and a user device identifier and a user identifier to an authentication server, sending the at least one of the application identifier and the user device identifier and the user identifier from the authentication server to a context management server; wherein the context management server has access to the context information used to generate the first dynamic value at the user device, generating a second dynamic value at the context management server based on the context information used to generate the first dynamic value, generating a second one time dynamic password at the authentication server based on the second dynamic value received from the context management server and the user PIN stored in the authentication server and authenticating the first one time dynamic password generated at the user device if it matches with the second one time dynamic password generated at the authentication server.

BRIEF DESCRIPTION OF THE DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
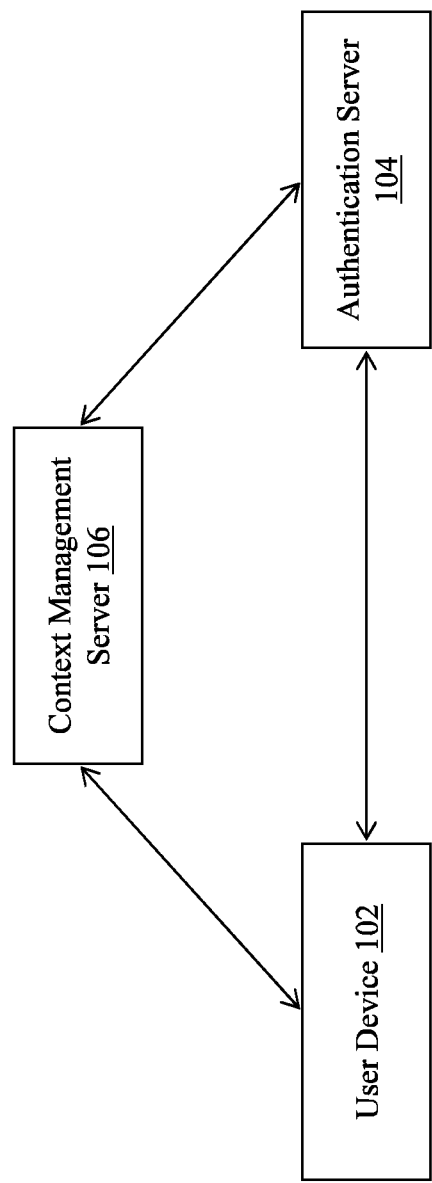
FIG. 1 illustrates an environment in which various embodiments of the invention presented herein may be practiced.

FIG. 1 illustrates an environment in which various embodiments of the invention presented herein may be practiced. The computing environment is not intended to suggest any limitation as to scope of use or functionality of the technology. The environment includes a user device 102, an authentication server 104 and a context management server 106. The user device 102 with an application generates a one time dynamic password based on context information related to the user or user device or the application. The context management server 106 is operably connected with the user device 102 in such a manner that the context manager in the context management server knows what context information is used at the user device 102 to generate the one time dynamic password. The context management server may also instruct what context information should the user device use to generate the first dynamic value. The authentication server 104 verify with the context management server 106 before authenticating the one time dynamic password.

Various examples of the user device 102 may include but are not limited to a mobile phone, a personal computer, a laptop, a tablet and so forth. The authentication server 104 may include an enterprise which authenticates the one time dynamic password generated at the user device 102. The context management server 106 may include but is not limited to a social network server, a telecommunication server and so forth.

Figure 2:
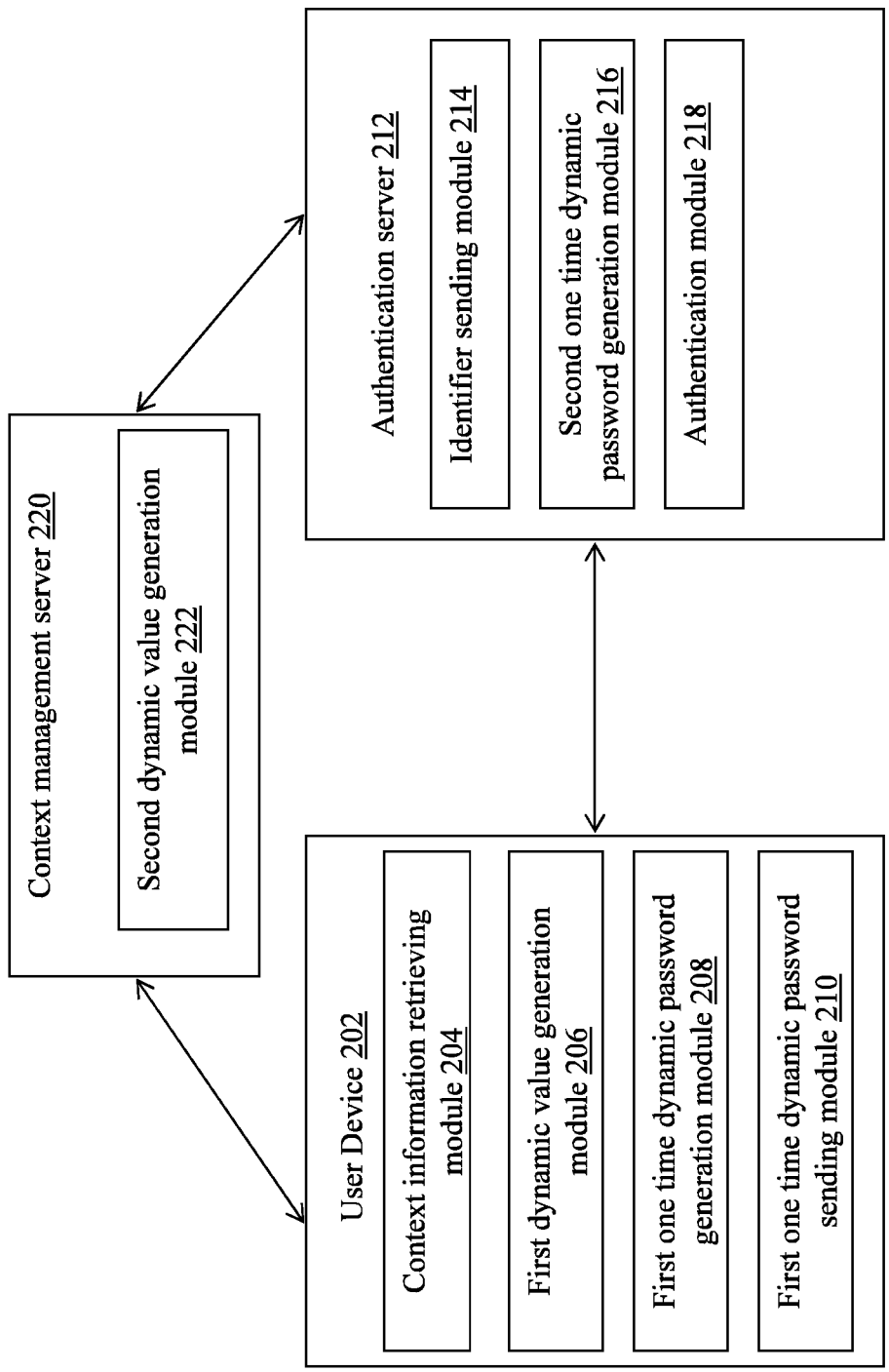
FIG. 2 is a block diagram illustrating a system for generating and authenticating a one time dynamic password based on context information, in accordance with an embodiment of the present invention.

FIG. 2 is a block diagram illustrating a system for generating and authenticating a one time dynamic password based on context information. More particularly, in FIG. 2, the system includes a user device 202 which comprises of a context information retrieving module 204, a first dynamic value generation module 206, a first one time dynamic password generation module 208 and a first one time dynamic password sending module 210; an authentication server 212 comprises an identifier sending module 214, a second one time dynamic password generation module 216 and an authentication module 218 and a context management server 220 comprises second dynamic value generation module 222.

In various embodiments of the present disclosure, the context information retrieving module 204 retrieves user context information. The context information includes user information or user device information or application information or combination thereof. Various examples of user information may include but are not limited to date of birth of the user, user address and other information provided by the user at the time of the registration for the application to a context manager hosted by a context management server 220. Various examples of user device 202 information may include but are not limited to location information of the device, type of handset used, handset attributes, such as screen size or version used, keyboard type and so forth, the usage information of the user device may include time of last call from the device, last call phone number, last time when a message was sent from the device, last data call and so forth. The location information of the user device 202 can be retrieve from list of base transceiver stations which the device listen to or through global positioning system (GPS). Various examples of application information include information related to the usage of the application, for example, it may include the login time or last logout time of the application, last response received after invoking the application and so forth.

In additional aspect of the system described, the first dynamic value generation module 206 generates a first dynamic value based on the retrieved context information. This dynamic value is a random number. The first one time dynamic password generation module 208 generates a first one time dynamic password by using the first dynamic value and a user personal identification number (PIN). The user PIN acts as a static value in generation of the first one time dynamic value. The user PIN information is stored in the authentication server. The user PIN is generated during the registration of the user with the authentication server. The first one time dynamic password sending module 210 sends the first one time dynamic password generated at the user device to the authentication server 212 for authentication along with the application identifier or user device identifier or user identifier or combination thereof The identifier sending module 214 sends the device identifier or user identifier or application identifier or combination thereof from the authentication server 212 to a context management server 220. This device identifier or user identifier or application identifier is already stored in the context management server 220. The user identifier may include login name, the user device identifier may include mobile number, International Mobile Equipment Identity (IMEI), device MAC address and application identifier may include application number issued at the time of registration of the application to track the application uniquely.

In further aspect of the system described, the second dynamic value generation module 222 generates a second dynamic value at the context management server by using the same context information used to generate the first dynamic value at the user device. The context management server has access to the context information used to generate the first dynamic value, i.e. the context management server 220 knows what context information have been used to generate the first dynamic value at the user device. The second one time dynamic password generation module 216 generates a second one time dynamic password by using the second dynamic value received from the context management server 220 and the user PIN stored in the authentication server 212. The authentication module 218 authenticates the first one time dynamic password generated at the user device 202 if it matches with the second one time dynamic password generated at the authentication server 212.

Figure 3:
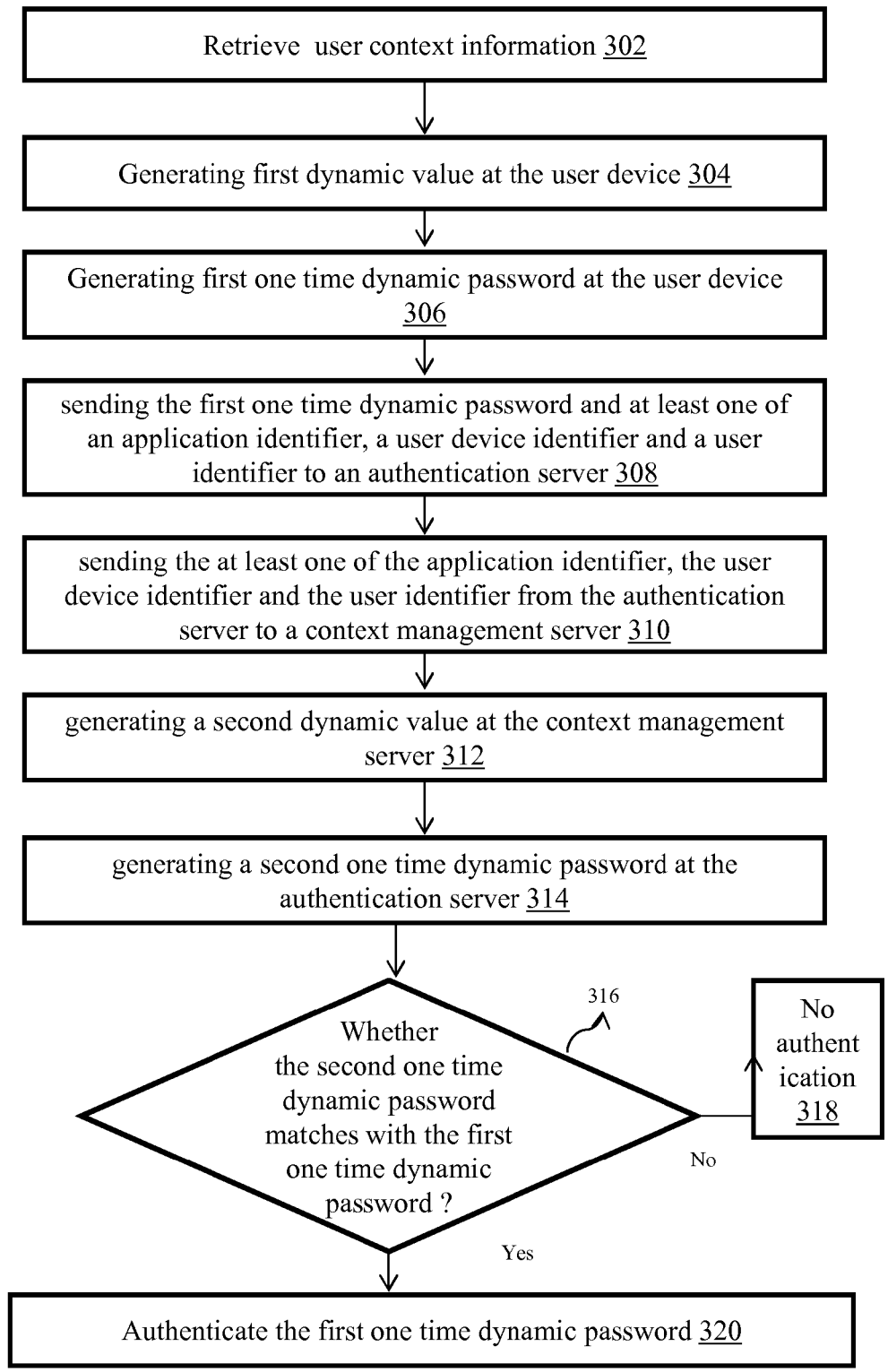
FIG. 3 is a flowchart, illustrating a method for generating and authenticating a one time dynamic password based on context information, in accordance with an embodiment of the present invention.

FIG. 3 is a flowchart, illustrating a method for generating and authenticating a one time dynamic password based on context information. The method includes retrieving the context information at the user device, as in block 302. The examples of the context information have been mentioned in details in conjunction with FIG. 2. Thereafter, a first dynamic value is generated based on the retrieved context information, as in block 304. Further, a first one time dynamic password is generated based on the first dynamic value and the user PIN, as in block 306. The user PIN information is stored in the authentication server. The user PIN is generated during the registration of the user with the authentication server. After that, the first one time dynamic password along with the application identifier or user device identifier or user identifier or combination thereof is sent to the authentication center, as in block 308. Further, as in block 310, the application identifier or user device identifier or user identifier or combination thereof is sent to the context management server from the authentication server. The context management server has access to the context information used to generate the first dynamic value, i.e. the context management server knows what context information have been used to generate the first dynamic value at the user device. By using this information the context management server generates a second dynamic value, as in block 312. Further, the authentication server receives the second dynamic value from the context management server and by using the second dynamic value and the stored user PIN it generates a second one time dynamic password, as in block 314. The next step is to check whether the second one time dynamic password generated at the authentication server matches with the first one time dynamic password generated at the user device, as in block 316. If the second one time dynamic password doesn't match with the first one time dynamic password then the authentication server doesn't authenticate the transaction, as in block 318. On the other hand, if the second one time dynamic password matches with the first one time dynamic password then the authentication server authenticates the password and user can proceed to the further step, as in block 320.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for generating and authenticating a one time dynamic password based on context information comprising:
receiving, by an authentication server, from a user device and without providing any variable to the user device a first one time dynamic password and at least one of an application identifier or a device identifier for the user device, wherein the first one time dynamic password is generated based on a first dynamic value and a user personal identification number (PIN) of a user of the user device and the first dynamic value is generated based on context information related to the user;
generating, by the authentication server, a second one time dynamic password based on a second dynamic value received from a separate context management server and the user PIN, wherein the second dynamic value is generated based on the context information used to generate the first dynamic value and the context information used to generate the first and second dynamic values is only accessible by the user device and the context management server; and authenticating, by the authentication server, the first one time dynamic password when the first one time dynamic password matches with the second one time dynamic password.

2. The method as claimed in claim 1, wherein the context information comprises at least one of user information, user device information or application information installed in the user device.

3. The method as claimed in claim 1, wherein the first and the second dynamic values each comprise a random number.

4. The method as claimed in claim 1, wherein the user PIN is a static value used to generate the one time dynamic password.

5. The method as claimed in claim 1, wherein the user PIN is stored in the authentication server.

6. The method as claimed in claim 1, wherein the user device comprises an electronic device.

7. A non-transitory computer readable medium having stored thereon instructions for generating and authenticating an one time dynamic password based on context information which when executed by a processor, cause the processor to perform steps comprising:

receiving, from a user device and without providing any variable to the user device a first one time dynamic password and at least one of an application identifier or a device identifier for the user device, wherein the first one time dynamic password is generated based on a first dynamic value and a user personal identification number (PIN) of a user of the user device and the first dynamic value is generated based on context information related to the user;

generating a second one time dynamic password based on a second dynamic value received from a separate context management server and the user PIN, wherein the second dynamic value is generated based on the context information used to generate the first dynamic value and the context information used to generate the first and second dynamic values is only accessible by the user device and the context management server; and authenticating the first one time dynamic password when the first one time dynamic password matches with the second one time dynamic password.

8. The medium as claimed in claim 7, wherein the context information comprises at least one of user information, user device information or application information installed in the user device.

9. The medium as claimed in claim 7, wherein the first and the second dynamic values each comprise a random number.

10. The medium as claimed in claim 7, wherein the user PIN is a static value used to generate the one time dynamic password.

11. The medium as claimed in claim 7, wherein the user device comprises an electronic device.

* * * * *